United States Patent [19]
Boyanich

[11] Patent Number: 5,653,125
[45] Date of Patent: Aug. 5, 1997

[54] COMPRESSOR WITH ISOLATED MOTOR WINDINGS

[76] Inventor: Joseph E. Boyanich, 16 Kaufman Rd., Cheektowaga, N.Y. 14225

[21] Appl. No.: 378,614

[22] Filed: Jan. 26, 1995

[51] Int. Cl.⁶ .................... F25B 39/04; F04B 17/00
[52] U.S. Cl. ............................... 62/508; 417/372
[58] Field of Search ................ 62/508, 428, 429; 417/372

[56] References Cited

U.S. PATENT DOCUMENTS

| | | | |
|---|---|---|---|
| D. 320,191 | 9/1991 | Yamaguchi | D13/112 |
| 3,955,112 | 5/1976 | Sell | 310/41 |
| 4,392,525 | 7/1983 | O'Mara et al. | 62/507 |
| 4,623,304 | 11/1986 | Chikada et al. | 417/312 |
| 5,113,102 | 5/1992 | Gilmore | 310/88 |
| 5,205,723 | 4/1993 | Kawai et al. | 417/415 |
| 5,233,824 | 8/1993 | Clevenger | 60/39.75 |
| 5,310,326 | 5/1994 | Gui et al. | 418/76 |
| 5,336,060 | 8/1994 | Tomell et al. | 417/410 D |

FOREIGN PATENT DOCUMENTS

| | | | |
|---|---|---|---|
| 633254 | 4/1927 | France | 62/508 |
| 276975 | 7/1970 | U.S.S.R. | 62/508 |
| 853274 | 11/1960 | United Kingdom | 62/508 |
| 025807 | 11/1994 | WIPO | 62/508 |

*Primary Examiner*—William E. Wayner
*Attorney, Agent, or Firm*—Richard C. Litman

[57] ABSTRACT

A refrigeration compressor of the hermetically sealed type. The rotor of the motor is enclosed within the envelope providing the seal, whereas the stationary winding is external to this envelope. The refrigerant circuit cools the compressor and rotor in the normal fashion, and the stationary winding is cooled by ambient air. This reduces the total cooling burden imposed upon the compressor and its motor, thus reducing electrical consumption. In some applications, the rotor includes a magnetic drive which rotates a fan external to the envelope, which fan moves ambient air over the winding, thereby cooling the same. Thus, a second benefit is provided in that one of two motors conventionally furnished in an air conditioning condensing unit is eliminated. This increases electrical energy savings since one large motor is normally more efficient than two smaller ones, when total outputs are equal.

3 Claims, 2 Drawing Sheets

COMPRESSOR WITH ISOLATED MOTOR WINDINGS

BACKGROUND OF THE INVENTION

1. Field of the Invention

The present invention relates to air conditioning and refrigeration, and more particularly to a vapor compression machine having an electric motor and a vapor compressor. In the novel machine, the motor rotor is encapsulated hermetically within a chamber together with the compressor, and the motor stationary windings are external to this chamber. Taking advantage of this segregation, the windings are air cooled, and the refrigerant circuit is protected against fouling and leakage of refrigerant.

2. Description of the Prior Art

In most air conditioning and refrigeration machines which are commercially available, the motor and compressor are enclosed within a common chamber which is hermetically sealed. Refrigerant conduits and electrical power conductor enter the chamber, which thus remains effectively sealed. No shaft passes through the seal, which would introduce the possibility of seal failure. Due to the highly corrosive nature of acids which would form if refrigerant were exposed to water vapor which is always present in the air, seal failure would normally quickly result in compressor failure.

The compressor is an expensive component, and restoration of refrigerant circuits is generally performed only by skilled technicians having specialized equipment. Therefore, it is greatly desirable to avoid compressor failure by rendering the compressor resistant to failure.

A significant source of failure resides in exposure to heat. It will be appreciated that the electric motor is heavily loaded in most refrigeration applications, and this heat must be dissipated to extend the service life of the motor. The situation is exacerbated by the nature of vapor compression machines, which concentrate heat present in the refrigerant. With the heat concentrated, the temperature rises, so that the temperature is elevated above the ambient temperature. While this enables ambient air to dissipate heat and enable the refrigeration machine to function, it nonetheless imposes a second heating burden upon the machine.

It has become standard practice to cause expanded, vaporous refrigerant being recirculated for a new compression cycle to pass over the motor and compressor to extend the longevity of both. While effective, this arrangement increases the heat dissipation burden imposed on the machine, and energy consumption rises accordingly.

Hermetically sealed refrigeration compressors are seen in U.S. Pat. Nos. 4,623,304, issued to Ichizo Chikada et al. on Nov. 18, 1986, 5,205,723, issued to Hideki Kawai et al. on Apr. 27, 1993, and 5,336,060, issued to Phillip A. Tomell et al. on Aug. 9, 1994. These inventions are typical of prior art compressors.

Electric motors having rotors which are encapsulated and separated from their associated stationary windings are shown in U.S. Pat. Nos. 3,955,112, issued to Otto W. Sell on May 4, 1976, and 5,113,102, issued to William Gilmore on May 12, 1992. Sell prevents contamination of the rotor and associated components such as shaft and bearings by airborne dirt, oil, and the like. Gilmore intends the motor for use in rotating a vacuum chamber which can be subjected to heat during an initial purging of water during assembly. Reduced time and effort of assembly are required when employing a motor constructed according to this invention.

The two examples of motors including rotors separately enclosed with respect to their associated windings do not suggest any implications for refrigeration machines.

None of the above inventions and patents, taken either singly or in combination, is seen to describe the instant invention as claimed.

SUMMARY OF THE INVENTION

The present invention provides a refrigeration compressor and motor assembly which cools stationary motor windings by dissipating heat to the open air. This is accomplished by enclosing the rotor in a sheath forming a chamber also enclosing the compressor, throughout which chamber refrigerant recirculates, while leaving the stationary windings exposed to ambient air.

The refrigerant circuit is conventional, delivering refrigerant vapor to the chamber housing the compressor and the rotor of the motor. This refrigerant cools these components in conventional fashion, but is not exposed to the stationary windings. Because the stationary winding is isolated from refrigerant, compressor lubricant, and shaft bearings, it may safely be exposed to ambient air without deleterious effect. Thus, the total burden of dissipating heat which is conventionally assumed by the compressor is, in the present invention, reduced by the amount of heat rejected to ambient air from the motor winding. Thus, the effort required of the motor is reduced, and energy savings are commensurately realized.

In a preferred construction, the hermetically sealed housing is furnished in two members. One is a stainless steel sheath which surrounds the rotor, fitting closely over the rotor and closely to the stationary winding. This sheath is attached to the remaining housing member by any suitable method maintaining the hermetic seal.

A consequence of refrigerant circuitry of conventional systems is that most small scale, consumer refrigeration machines, such as refrigerators and home air conditioning units must be provided with hermetically sealed compressors for economic reasons. Such compressors include many components which are subject to failure, such as reed valves. In the event of failure of a small component such as an inexpensive reed valve, the entire compressor must be replaced if it is of the sealed type.

By contrast, the present invention renders it feasible to abolish the traditional hermetically sealed compressor. The actual compressor and the rotor of the motor are still sealed from the atmosphere. However, the stationary motor windings and associated electrical connections are exposed to the open air. These components can easily be serviced or replaced without disturbing the pressurized refrigerant circuit.

Abolition of the traditional metal can providing the hermetic seal leads to additional possible improvements in compressors. The sealed housing can more feasibly be formed from cast components, which could be assembled together using gaskets to maintain the seal. Cast housing components can be machined to accept different types of fittings, such as transducers and valves. Transducers could thus be more feasibly incorporated for detecting pressure and temperature values to signal the same for alarm annunciation, starting, and stopping functions. Valves could be provided to enable isolation of parts of the refrigerant circuit from the compressor, thus enabling simplified servicing procedures, which would likely lead to repair rather than wholesale replacement of compressor assemblies.

It would be easy to provide additional fittings either originally or to retrofit the same to existing installations. These improvements could lead to reduced service costs in refrigeration installations as well as enhancing functions.

The novel compressor may be employed in applications with or without a cooling fan for moving ambient air. Residential refrigerators are typical of the latter. In lieu of the fan, the vapor condensing tube or capillary is configured as a large grid. Air absorbing heat from the capillary moves by convection.

Residential air conditioning systems are exemplary of the former application. These systems are of such power that ambient cooling air must be forced, rather than moved by convection. In typical exteriorly located condensing units serving these air conditioning systems, a second motor is provided to drive the cooling fan. It is normally not possible to combine the compressor and fan motors, although this would be desirable, since the fan is external to the compressor chamber, and the hermetic seal would be penetrated.

In the present invention, the cooling fan is magnetically driven from within the chamber. Air is forced over the windings, which are thereby cooled. The same fan may be employed to draw air across the condensing coil. With the compressor motor powering both the compressor and the condensing fan, the two motors normally furnished to drive these two appliances, when provided in a compressor and condensing unit, may be reduced to one. This provides an additional energy savings when motors of ordinary commercial design are employed, since one large motor is usually more efficient than two smaller motors of equivalent total power output.

It should be recognized that the principles set forth herein apply to linear type motors as well as to rotary motors. It is anticipated that as the refrigeration industry pursues improvements in efficiency, linear motors, including devices also known as solenoids, will be employed for compressors. Linear motors allow omission of the traditional connecting rod with its attendant inertial and frictional losses. Sheathing of the armatures of such motors can be performed as easily as sheathing of rotors. Thus, the terms "motor" and "rotor" will be understood to apply equally to linear motors as well as to rotary motors for the purposes of this invention.

Accordingly, it is a principal object of the invention to provide a refrigeration compressor wherein the refrigerant circuit is isolated from the stationary motor windings, the latter being air cooled by ambient air.

It is another object of the invention to reduce the thermal burden imposed upon the compressor and its motor.

It is a further object of the invention to drive a cooling fan from the enclosed rotor.

Still another object of the invention is to eliminate one motor from a condensing unit.

An additional object of the invention is to drive a condensing fan magnetically from the compressor motor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
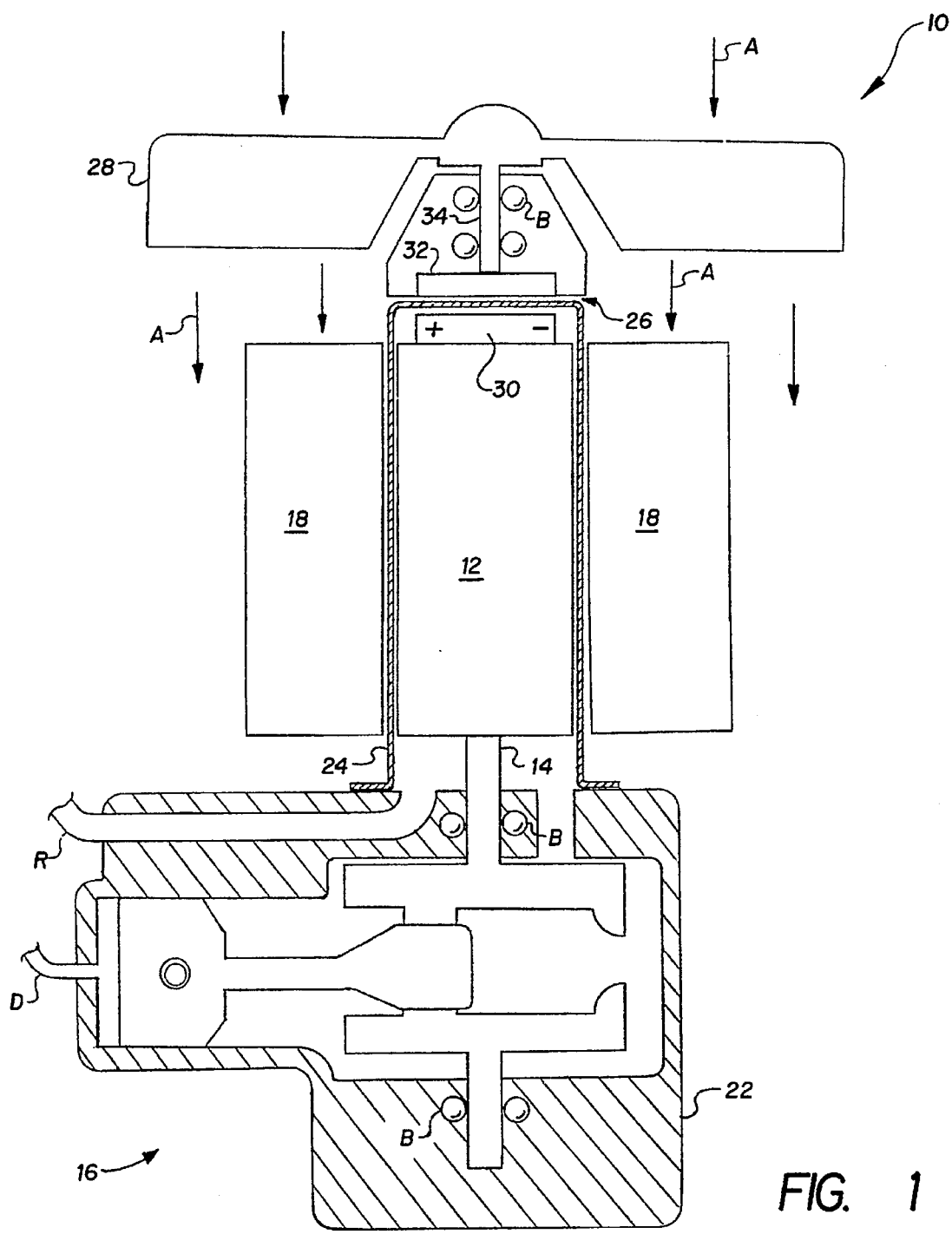
FIG. 1 is a diagrammatic, side elevational, cross sectional view of the novel compressor.

Turning now to FIG. 1 of the drawings, the novel compressor 10 is seen to include a rotor 12 mounted to a shaft 14, a compressor 16 also mounted to shaft 14, and stationary winding 18.

Compressor 16 is illustrated as being of the reciprocating piston type, but in fact may be any compressor suitable for vapor compression, such as a scroll type compressor, a screw type compressor, a meshing gear type compressor, or any other type. Moreover, compressor 16 is shown diagrammatically, and certain necessary and conventional components such as oil pump and check valves are present but not shown. Other components, such as bearings B, discharge line D, and return line R are shown in abbreviated or symbolic form only.

Compressor 16 is of the hermetically sealed type, with refrigerant passing within a housing. Incidental contact of refrigerant with components of compressor 16, shaft 14, and rotor 12 cools these components and further heats the refrigerant. This heat will be dissipated to the atmosphere when the refrigerant is compressed and conducted through a conventional condensing coil (not shown). The housing is formed in two members for convenience. First member 22 surrounds compressor 16, and is open to rotor 12. The second member 24 is placed over rotor 12 during assembly, and is sealingly attached to member 22. A chamber is thus formed in which refrigerant is free to flow across the internal components of compressor 16, shaft 14, and rotor 12.

This chamber is isolated from access to the atmosphere, so that refrigerant remains uncontaminated. Atmospheric air contacts and thus cools stationary winding 18.

In some applications, convective cooling will be sufficient to maintain winding 18 at a suitable temperature. In other applications, it will be necessary to force air over winding 18 to achieve necessary cooling thereof. To accomplish this without requiring an additional motor, a magnetic drive is provided to drive a fan 28.

Drive 26 comprises magnets 30 coupled to rotor 12, which magnets 30 are attracted to a magnetically attracting member 32 attached to fan shaft 34. Magnetically attracting member 32 may be either magnetic itself or non-magnetic. As rotor 12 rotates, fan 28 is induced to rotate by the magnetic drive 26. Air flow is indicated by arrows A.

Figure 2:
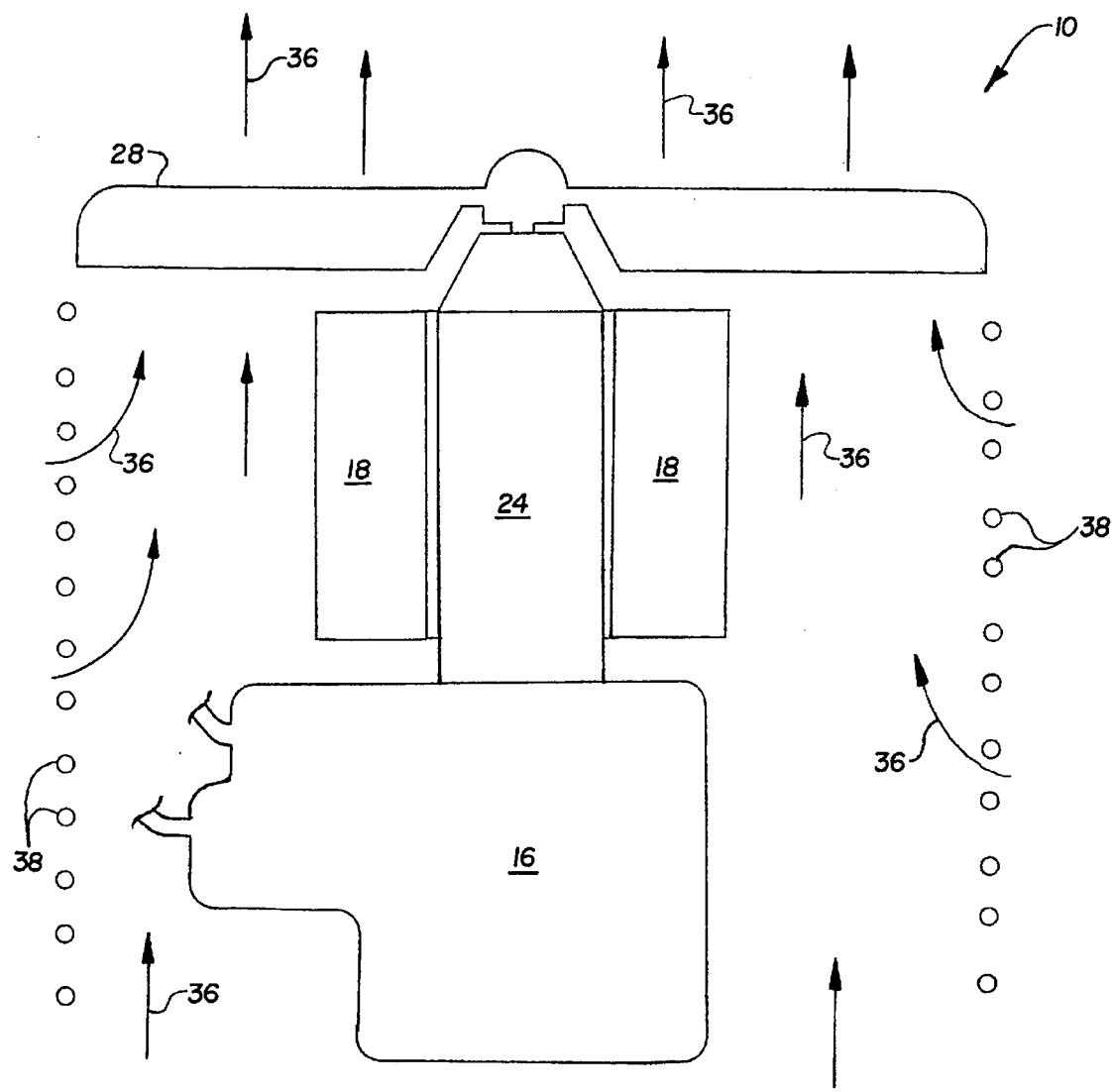
FIG. 2 is a diagrammatic view of the invention, showing the embodiment incorporating a magnetically driven cooling fan.

As illustrated in FIG. 2, a representative exterior condensing unit is illustrated, wherein fan 28 is of considerably greater diameter than that of winding 18. With air being drawn upwardly, as depicted herein by arrows 36, fan 28 cools both winding 18 and also a surrounding condensing coil 38.

Again referring to FIG. 1, housing member 24 is formed from any suitable material, preferably any stainless steel alloy which will resist conditions encountered in refrigeration compressors. Member 24 may be bolted to member 22, as shown, or otherwise connected so as to maintain the hermetic seal.

Obviously, variations of and modifications to the invention will occur to those of skill in the art. For example, in some applications it would be possible to omit intended circulation of refrigerant past rotor 12, there being only incidental permeation of refrigerant thereabout. In this instance, to avoid providing an extremely expensive or failure prone seal at a location indicated generally at 40 in FIG. 1, the present invention may be practiced.

It is to be understood that the present invention is not limited to the sole embodiment described above, but encompasses any and all embodiments within the scope of the following claims.

I claim:

1. A hermetically sealed refrigeration compressor comprising:

a hermetically sealed housing formed to include first and second mating members;

a compressor enclosed within said first housing member;

an electric motor drivingly associated with said compressor, said motor comprising a rotor enclosed within said second housing member, said rotor having a first end and an opposing second end, said first end having a rotor shaft extending therefrom for driving said compressor, a stationary winding disposed about said rotor outside of said housing;

a fan for moving ambient air over said stationary winding, said fan having a fan shaft, said fan mounted outside said housing proximate said second end of said rotor;

a magnetic drive including a magnet coupled to said second end of said rotor and a magnetically attracting member attached to said fan shaft, said magnet being rotated by said rotor and said fan shaft being magnetically responsive to rotation of said rotor; and a condensing coil circumferentially surrounding said housing and said stationary winding, said fan drawing ambient air across said condensing coil and said stationary winding.

2. The refrigeration compressor according to claim 1, wherein said fan projects substantially beyond said stationary winding.

3. The refrigeration compressor according to claim 1, said second mating member made from stainless steel.

* * * * *